Figure 1:
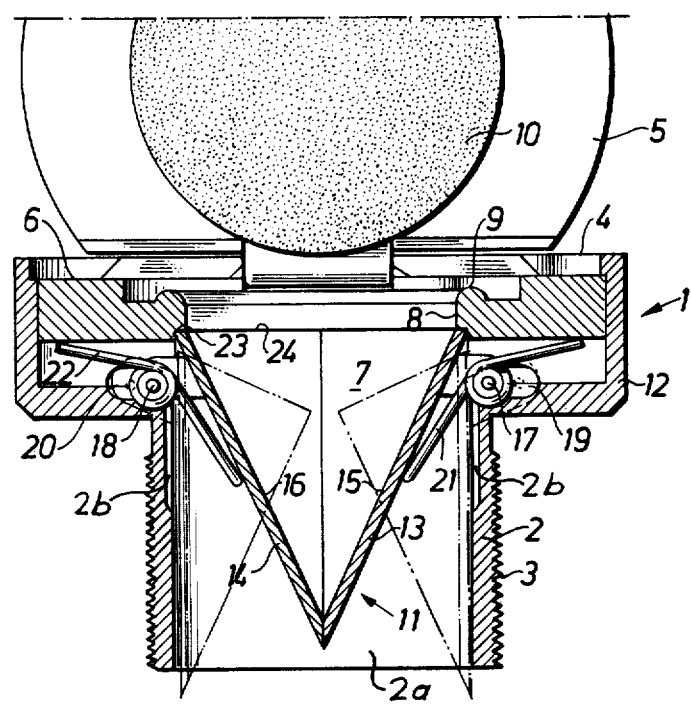

United States Patent [19]

Narfgren

[11] 4,214,729
[45] Jul. 29, 1980

[54] CONNECTING VALVE

[75] Inventor: Rune Narfgren, Tyresö, Sweden

[73] Assignee: AB Svenska Fläktfabriken, Stockholm, Sweden

[21] Appl. No.: 962,467

[22] Filed: Nov. 20, 1978

[30] Foreign Application Priority Data

Nov. 28, 1977 [SE] Sweden ............................. 7713443

[51] Int. Cl.³ ........................................... F16L 29/00
[52] U.S. Cl. ................................. 251/149.2; 137/360; 137/362; 251/149.6
[58] Field of Search ............................... 137/360, 362; 251/149.2, 149.6, 149.7

[56] References Cited

U.S. PATENT DOCUMENTS

| | | | |
|---|---|---|---|
| 3,127,148 | 3/1964 | Collar | 251/149.2 |
| 3,672,630 | 6/1972 | Naumburg et al. | 251/149.2 |
| 3,754,564 | 8/1973 | Naumburg et al. | 137/360 |
| 4,007,909 | 2/1977 | Buseth et al. | 251/149.6 X |

FOREIGN PATENT DOCUMENTS

| | | |
|---|---|---|
| 1816790 | 7/1970 | Fed. Rep. of Germany . |
| 203229 | 3/1966 | Sweden . |
| 310241 | 4/1969 | Sweden . |
| 313640 | 11/1969 | Sweden . |
| 319873 | 5/1970 | Sweden . |
| 335601 | 9/1971 | Sweden . |

*Primary Examiner*—Gerald A. Michalsky
*Attorney, Agent, or Firm*—Dann, Dorfman, Herrell and Skillman

[57] ABSTRACT

The present invention relates to a connecting valve for connecting the hose of vacuum cleaning equipment into the suction duct of a built-in cleaning system. The connecting valve is positioned behind a flap cover for the suction duct opening and comprises a pair of complimentary valve elements which mate in closed position to close the duct opening, and which provide straight tubular passageway when open for accepting the tubular end of the hose of the vacuuming equipment. Each valve element is formed of a segment of a tubular pipe and is pivoted adjacent the duct opening so that it may be operated from closed position to open position by the insertion of the end of the vacuum hose into the opening. Each element is biased toward closed position so that withdrawal of the hose effects closing of the valve.

3 Claims, 2 Drawing Figures

CONNECTING VALVE

The present invention relates to a built-in vacuum system and particularly to a connecting valve positioned in the suction outlets of such system.

It is known since long to install in central installations so-called silent valves in such rooms where disturbing noise cannot be tolerated. This applies especially to hospitals and by and large to rooms, in which persons stay when the installation is in operation. Such connecting valves are known in a great number of different designs, for example designs as they are described in the Swedish patent specifications Nos. 203 229, 310 241, 313 640, 319 873, 320 470, 335 601 and 343 205. All of these valves are provided with some device for preventing air from passing into the ducts being under vacuum when a connecting nozzle is connected to the duct system. Without such a sealing device, the air would flow at a high rate into the piping during the time required for opening the valve and connecting the connecting nozzle, thereby giving rise to a very strong and disturbing noise. All of the silent valves, however, have disadvantages rendering them more or less unsuitable for the purpose in question. Some of said valves, for example, have a mechanically complicated structure, so that they are expensive to manufacture, require much space and are difficult to build-in in walls or floors. Some valves require connecting pieces of a special design and are complicated to connect, and other valves are designed so that the valve and the associated connecting piece have a small free cross-sectional area in relation to the hose and duct dimension, which implies a high flow resistance for the air through the valve and a great risk that the valve is clogged by dust and trash following with the air stream.

The present invention has the object to provide an improved connecting valve, which does not show the disadvantages of conventional valves. This object is achieved by a valve, which is designed according to the characterizing clause of the attached claim 1. Advantageous embodiments become apparent from the attached subclaims.

Figure 2:
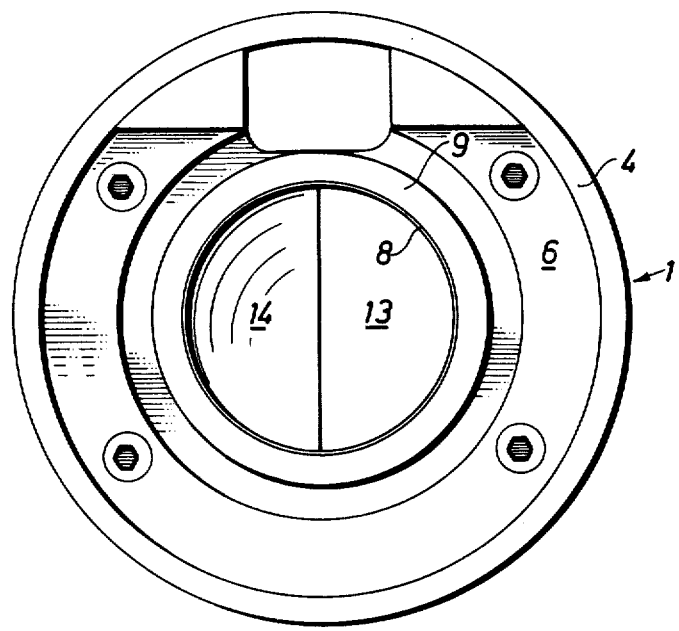

The invention is described in the following, with reference to the accompanying drawing, in which FIG. 1 is a section through a connecting valve according to the invention, FIG. 2 is a front view of the same valve.

In FIG. 1 the numeral 1 designates a valve housing, which preferably is intended to be built-in in a wall or a floor. The lower portion of the valve housing consists of a tubular member 2, which is provided with a thread 3 for connection to the duct built-in in the wall or floor. At the front side 4 of the valve housing a cover 5 (partially shown) is hingedly mounted, so that the cover can be folded down against the valve and thereby rests against a plane surface 6 in the front side of the housing. Hereby the duct 7 is locked, which at the front side of the valve housing is defined by a cylindric mouth portion 8, the diameter of which substantially corresponds to the outer diameter of the connecting nozzle in question. Said mouth portion 8 is provided at its upper surface with a plane annular ridge 9, which serves as a seat for a circular gasket 10 attached to the cover. In folded-down position the cover 5 with the gasket 10 provides an efficient sealing of the duct 7, so that no ambient air can enter into the duct being under vacuum. The connecting valve described so far corresponds to a conventional non-silent valve. The valve further is provided with an inner shut-off device 11, which according to the invention consists of two flaps 13,14 mounted in the upstream portion 12 of the valve housing 1. Said flaps when in closed position form a funnel-shaped closure of the mouth of the suction duct 7, with the point end of the funnel directed inward to the duct. Each flap is formed as a portion cut out of a cylindric pipe wall, the concave surface 15,16 of which agrees with the outer shell surface of the connecting nozzle. Said flaps 13,14 have rotary shafts 17,18, which are mounted in grooves 19,20 in the valve heating housing in order to bring about a combined rotation and displacing movement when the connecting nozzle is being inserted. About said shafts 17,18 torsion springs 21,22 are mounted, which pre-stress the valve flaps 13,14 to an extent sufficient to act against the vacuum prevailing in the system. The inner surface 2a of the valve housing located about the flaps has cylindric shape with a diameter substantially being equal to the sum of the outer diameters of the connecting nozzle and twice the material thickness of the flaps. Recesses 2b, further, are provided for those portions of the springs of the flaps which are attached between the flaps and the inner surface of the valve housing. Accordingly, a relatively small gap is required between the outer diameter of the connecting piece and the inner diameter of the tubular piece 2, and therefore the free cross-sectional area at the valve is not much smaller than the corresponding area of the duct system and, respectively, of the connecting hose. Owing thereto, the flow resistance is low and the risk of clogging in the connecting valve is small.

When being in closed position, the flaps together form at their ends facing to the opening of the valve housing an annular defining surface 24, which abuts an annular seat 23 formed at the mouth portion 8. In the foregoing an embodiment with two flaps has been described, but embodiments with three or more flaps can also be imagined.

The connecting valve operates as follows. In closed position the flaps 14,15 close the duct 7, while additional closing against the outside air is provided by the cover 5 and associated gasket 10. When the connecting nozzle is to be connected, the cover is opened and the connecting nozzle is inserted into the mouth portion 8, whereafter at further insertion the forward portion of the connecting nozzle actuates the flaps 14,15 being in closed position. The mounting shafts 17,18 of the flaps are displaced in lateral direction in the grooves 19,20 while at the same time the flaps are opened by rotary movement about said shafts. Owing to this arrangement, the force required for the first opening movement is small, and when the connecting nozzle is inserted further, the torque arm formed between the engagement points on the flap and its rotary shaft increases, whereby a greater moment is obtained which easily can overcome the spring forces. When the connecting pipe is inserted entirely into the connecting valve, the flaps are located between the outer surface of the connecting nozzle and the inner surface 2a of the tubular member 2. Owing to their special design, the flaps join tightly adjacent said surfaces, and the necessary space therebetween, thus, is small. This implies, that the cross-sectional area of the duct 7 substantially can correspond to the remaining cross-sectional areas of the ducts comprised in the system, i.e. the cross-sectional areas of the connecting hose as well as of the built-in ducts. The connecting valve according to the invention, thus, provides low resistance to the suction air, which is important for the operation of the installation, and at the same time the clogging risk is at minimum. Other advantages of the valve are its simple mechanical structure, which means low manufacturing costs, its small outer dimensions and its reliable operation.

I claim:

1. A connecting valve for connecting a tubular connecting nozzle for a vacuum cleaning equipment to a suction duct system, said nozzle having a cylindrical outer surface, said connecting valve consisting of a valve housing provided with an outer cover, and an inner shut-off device for the vacuum in the suction duct system actuated by the connecting nozzle and provided with at least two spring-prestressed flaps (13,14) mounted for pivotal movement on shafts in the upstream portion (12) of the valve housing (1), which flaps in closed position abut each other and thereby form a funnel-shaped closure of the mouth of the suction duct (7), the point end of the funnel being directed inward to the duct, each flap being formed as a portion cut out of a cylindrical pipe wall, the concave surface (15,16) of which agrees with the outer surface of the connecting nozzle, said shafts being mounted in grooves (19,20) permitting outward displacement of said shafts in the valve housing in order to bring about a combined rotation and displacing movement of the flaps upon insertion of the connecting nozzle therebetween.

2. A connecting valve according to claim 1, including torsion springs mounted about the shafts of the flaps for prestressing the flaps.

3. A connecting valve according to claim 1 including spring means for each flap urging said shaft means toward the center of said housing and said flaps toward closed position throughout their movement.

* * * * *